(12) United States Patent
Matsumoto et al.

(10) Patent No.: US 9,481,334 B1
(45) Date of Patent: Nov. 1, 2016

(54) VEHICLE FRONT SECTION STRUCTURE

(71) Applicant: TOYOTA JIDOSHA KABUSHIKI KAISHA, Toyota-shi (JP)

(72) Inventors: Ryoji Matsumoto, Okazaki (JP); Hironori Kadoi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/697,993

(22) Filed: Apr. 28, 2015

(51) Int. Cl.
    *B60R 19/34*     (2006.01)
    *B60R 19/24*     (2006.01)

(52) U.S. Cl.
    CPC .......... *B60R 19/34* (2013.01); *B60R 2019/247* (2013.01)

(58) Field of Classification Search
    CPC ........................ B60R 19/34; B60R 2019/247
    USPC ........................................ 296/187.1; 293/133
    See application file for complete search history.

(56) References Cited

U.S. PATENT DOCUMENTS

| | | | | |
|---|---|---|---|---|
| 7,284,788 | B1 * | 10/2007 | Barbat ..................... | B60R 19/34 293/133 |
| 8,419,116 | B2 * | 4/2013 | Boettcher ............... | B60R 19/24 293/133 |
| 8,596,711 | B2 * | 12/2013 | Yasui ..................... | B60R 19/34 296/187.09 |
| 2016/0059810 | A1 * | 3/2016 | Watanabe ............... | B60R 19/24 293/133 |
| 2016/0101751 | A1 * | 4/2016 | Bou ..................... | B62D 21/152 293/133 |
| 2016/0121932 | A1 * | 5/2016 | Suzuki ................. | B62D 21/152 296/187.09 |

FOREIGN PATENT DOCUMENTS

JP             2014-113894 A      6/2014

* cited by examiner

*Primary Examiner* — Pinel Romain
(74) *Attorney, Agent, or Firm* — Oblon, McClelland, Maier & Neustadt, L.L.P

(57) ABSTRACT

An extension portion extending out toward the vehicle width direction outer side is provided at a rear face of a vehicle width direction outer side end portion of bumper reinforcement. A projection portion projecting out toward the vehicle front side is disposed at a front face of the extension portion, at a position separated to the vehicle width direction outer side of the vehicle width direction outer side end portion of the bumper reinforcement. A front end portion of a spacer, having a rear end portion joined to the side face on the vehicle width direction outer side of a front side member and extending out to the vehicle width direction outer side of the front side member, is joined to a rear face of the extension portion. Moreover, one end portion of an inner wall of the extension portion is disposed at the vehicle front side of an inside wall of the spacer, with the extension portion interposed therebetween, and one end portion of an outer wall of the projection portion is disposed at the vehicle front side of an outside wall of the spacer, with the extension portion interposed therebetween.

10 Claims, 10 Drawing Sheets

VEHICLE FRONT SECTION STRUCTURE

BACKGROUND

1. Technical Field

The present invention relates to a vehicle front section structure adapted for a frontal collision.

2. Related Art

There are various modes of frontal collision, including full overlap collisions, offset collisions, and oblique collisions. Recently, there are calls for countermeasures against more demanding collision modes, such as small overlap collisions (passing collisions) or similar collisions, in which another vehicle or the like (referred to below as a "barrier") collides at the vehicle width direction outer side of a front side member.

As an example of a small overlap collision countermeasure, technology has been proposed in which a spacer is provided from a rear face of a vehicle width direction end portion of front bumper reinforcement toward a side face of a front side member (see, for example, Japanese Patent Application Laid-Open (JP-A) No. 2014-113894). According to this technology, in the event of a small overlap collision, collision load input to the vehicle width direction end portion of the front bumper reinforcement is transmitted by the spacer to the side face of the front side member. The front side member accordingly undergoes bending deformation toward the vehicle width direction inside, and the bent location contacts a side face of a power unit that is a section of the vehicle where mass is concentrated. Lateral force (force due to inertia) on the power unit is accordingly generated toward the opposite side to the collision side, enabling the vehicle itself to be moved toward the opposite side to the collision side, and moving the vehicle away from a barrier.

Although the above technology is beneficial, further improvement is desired with respect to small overlap collisions. Specifically, in order for collision load to be effectively transmitted from a barrier to a front side member through a spacer, bumper reinforcement needs to make contact with the barrier at an early stage. Moreover, improvement to the shape of a vehicle width direction outer side end portion to the bumper reinforcement is required in order for the collision load to be effectively transmitted to the spacer after the bumper reinforcement has contacted the barrier.

In consideration of the above circumstances, an object of the present invention is to obtain a vehicle front section structure enabling collision load to be swiftly and effectively transmitted to a front side member in a small overlap collision, and of increasing lateral force generated on a power unit.

SUMMARY

In order to achieve the above object, a vehicle front section structure comprising: a pair of left and right front side members extending along a vehicle front-rear direction at both vehicle width direction sides of a power unit installed in a vehicle front section; a bumper reinforcement connecting together front end portions of the pair of left and right front side members in a vehicle width direction; an extension portion that extends further to a vehicle width direction outer side from a rear face of a vehicle width direction outer side end portion of the bumper reinforcement; a projection portion that is disposed at a front face of the extension portion, at a position separated to the vehicle width direction outer side of the vehicle width direction outer side end portion of the bumper reinforcement, and that projects out toward a vehicle front side; and a spacer that is joined at a rear end portion thereof, to a side face on the vehicle width direction outer side of the front side member, that extends out to the vehicle width direction outer side of the front side member, and that has a front end portion of the spacer joined to a rear face of the extension portion, wherein: the projection portion includes an inner wall that has one end portion fixed to a front face of the extension portion, and that extends out toward the vehicle front side, an outer wall that is disposed at the vehicle width direction outer side of the inner wall, that has one end portion fixed to the front face of the extension portion, and that extends out toward the vehicle front side, and a front wall that connects another end portion of the inner wall to another end portion of the outer wall, the spacer includes an inside wall having at least a front portion disposed at an angle toward the vehicle width direction outer side, such that the front portion is positioned further to the vehicle width direction outer side than a rear portion with respect to the side face on the vehicle width direction outer side of the front side member, and an outside wall that is disposed at the vehicle width direction outer side of the inside wall, with at least a front portion of the outside wall disposed at an angle toward the vehicle width direction outer side, such that the front portion is positioned further to the vehicle width direction outer side than a rear portion with respect to the side face on the vehicle width direction outer side of the front side member, and the one end portion of the inner wall is disposed at the vehicle front side of the inside wall with the extension portion interposed therebetween, and the one end portion of the outer wall is disposed at the vehicle front side of the outside wall with the extension portion interposed therebetween.

According to the vehicle front section structure of an aspect of the present invention described above, the extension portion is provided to the vehicle width direction outer side end portion of the bumper reinforcement, and extends from the rear face of the end portion further to the vehicle width direction outer side. The projection portion, projecting out toward the vehicle front side at a position separated to the vehicle width direction outer side of the vehicle width direction outer side end portion of the bumper reinforcement, is disposed at the front face of the extension portion. The front end portion of the spacer that is joined at the rear end portion to the side face on the vehicle width direction outer side of the front side member, and that extends out to the vehicle width direction outer side of the front side member, is joined to the rear face of the extension portion. The barrier accordingly contacts the projection portion promptly in a small overlap collision. Collision load is accordingly input to the projection portion from an early stage in the small overlap collision. The collision load input to the projection portion is transmitted through the extension portion to the spacer. The collision load transmitted to the spacer is transmitted to the side face on the vehicle width direction outer side of the front side member. The front side member accordingly undergoes bending deformation toward the vehicle width direction inside, and the location that has undergone bending deformation contacts the power unit, generating lateral force (force due to inertia) on the power unit toward the opposite side to the collision side.

Note that in the present invention, the projection portion includes the inner wall that has one end portion fixed to the front face of the extension portion, and that extends out toward the vehicle front side, the outer wall that is disposed at the vehicle width direction outer side of the inner wall, that has one end portion fixed to the front face of the extension portion, and that extends out toward the vehicle front side, and the front wall that connects the other end portion of the inner wall to the other end portion of the outer wall. The spacer includes the inside wall with at least the front portion disposed at an angle toward the vehicle width direction outer side, such that the front portion is positioned further to the vehicle width direction outer side than the rear portion with respect to the side face on the vehicle width direction outer side of the front side member, and the outside wall that is disposed at the vehicle width direction outer side of the inside wall, with at least the front portion disposed at an angle toward the vehicle width direction outer side, such that the front portion is positioned further to the vehicle width direction outer side than the rear portion with respect to the side face on the vehicle width direction outer side of the front side member. Moreover, the one end portion of the inner wall is disposed at the vehicle front side of the inside wall with the extension portion interposed therebetween, and the one end portion of the outer wall is disposed at the vehicle front side of the outside wall with the extension portion interposed therebetween.

Collision load input to the inner wall of the projection portion is thus efficiently transmitted through the extension portion to the inside wall of the spacer. Similarly, collision load input to the outer wall of the projection portion is efficiently transmitted through the extension portion to the outside wall of the spacer. Adjusting the projection amount of the projection portion enables the timing at which the front side member is made to undergo bending deformation to be controlled. In addition, the projection portion is disposed at a position separated to the vehicle width direction outer side of the vehicle width direction outer side end portion of the bumper reinforcement, thereby enabling a bending moment input to the front side member from the spacer to be increased, and thus enabling the front side member to be made to undergo stable bending deformation toward the vehicle width direction inside. Moreover, since the projection portion is present at the vehicle front side of the spacer, with the extension portion interposed therebetween, when the spacer is squeezed between the barrier and the power unit and generates load, a length from the other end portion of the projection portion to the rear end portion of the spacer, and a vehicle width direction length (overlap amount) from the other end portion of the projection portion to the rear end portion of the spacer, increase by an amount corresponding to the projection amount of the projection portion at the point in time when the front side member that has undergone bending deformation contacts the power unit. The duration for which lateral force is generated on the power unit is accordingly lengthened, enabling a commensurate increase in lateral force.

As described above, a vehicle front section structure according to an aspect of the present invention enables collision load to be swiftly and effectively transmitted to a front side member in a small overlap collision, and enables lateral force generated on a power unit to be increased.

DETAILED DESCRIPTION

Figure 1:
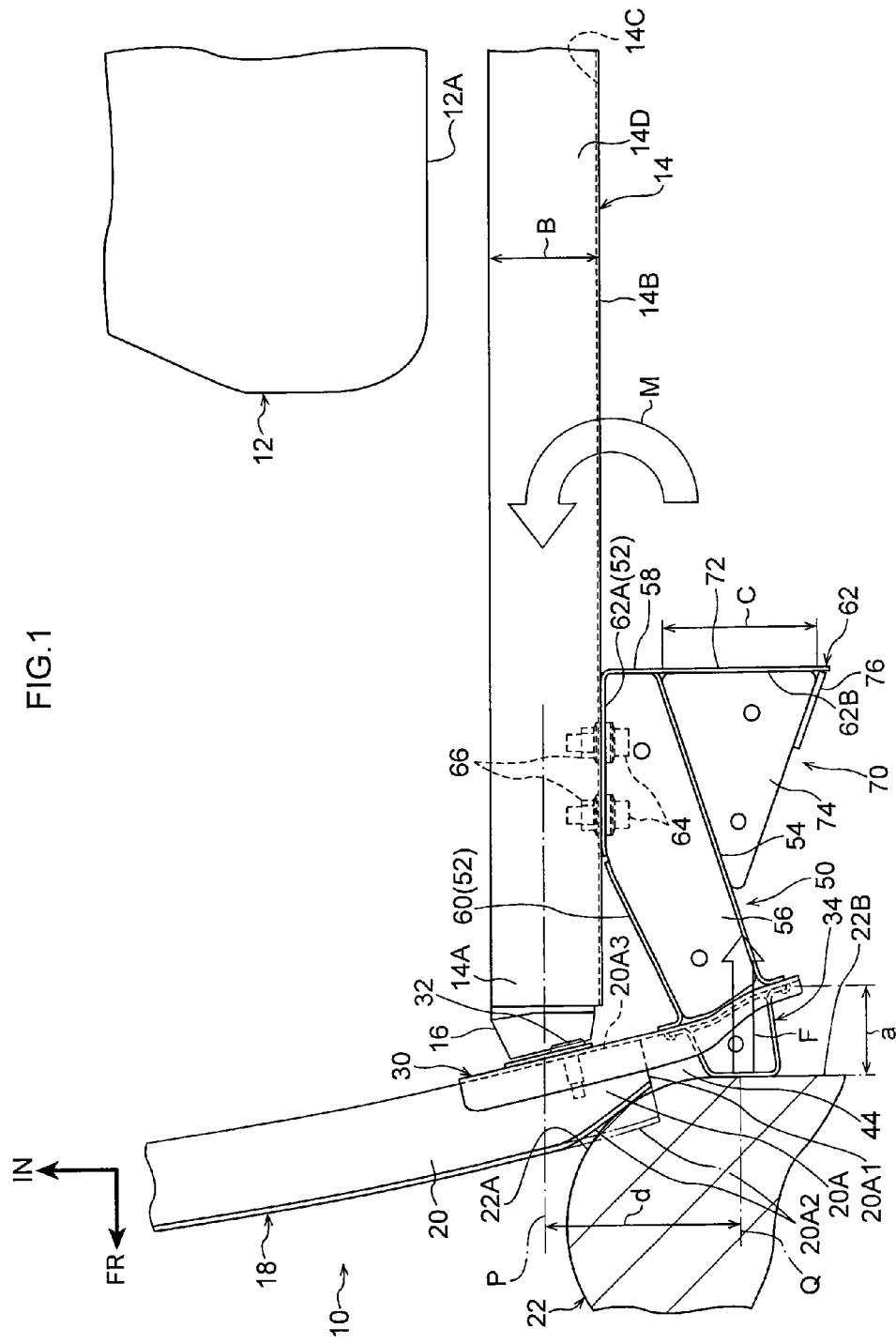
FIG. 1 is a plan view of an overall vehicle front section structure of an exemplary embodiment of the present invention, illustrating a state in an initial period during a small overlap collision.

Detailed explanation follows regarding an exemplary embodiment of the present invention, with reference to the drawings. In the drawings, the arrow FR indicates a vehicle front side, the arrow UP indicates the vehicle upper side, and the arrow IN indicates the vehicle width direction inside, as appropriate.

Peripheral Configuration

As illustrated in FIG. 1, a power unit 12 is installed in a vehicle front section 10. A pair of left and right front side members 14 are installed extending along the vehicle front-rear direction at both vehicle width direction sides of the power unit 12. Each front side member 14 is disposed with its length direction along the vehicle front-rear direction. Each front side member 14 has a rectangular shaped cross-section profile. As an example, each front side member 14 is configured with a closed cross-section structure by joining together a pair of flanges of an inner panel disposed on the vehicle width direction inside, and a pair of flanges of an outer panel disposed on the vehicle width direction outer side, by a joining method such as spot welding. Note that the configuration of the front side members is not limited thereto, and various structures may be employed.

Front end portions 14A of the pair of left and right front side members 14 are coupled together by bumper reinforcement 18, through spacers 16 that are joined to the front end portions 14A and extension portions 30, described later. The bumper reinforcement 18 is a high strength and high rigidity member disposed with its length direction substantially along the vehicle width direction, and is, for example, configured with a rectangular shaped closed cross-section structure. Note that the configuration of the bumper reinforcement 18 is not limited thereto, and various structures may be employed.

In plan view of the bumper reinforcement 18, a vehicle width direction intermediate portion of the bumper reinforcement 18 is formed substantially in a straight line shape along the vehicle width direction, while vehicle width direction outer side portions 20 of the bumper reinforcement 18 are formed with gently curved profiles. End faces 20A1 of vehicle width direction outer side end portions 20A of the bumper reinforcement 18 are disposed further to the vehicle width direction outer side than vehicle width direction outer side side faces 14B of the front side members 14. In FIG. 1, a state in which a front face 20A2 of the vehicle width direction outer side end portion 20A of the bumper reinforcement 18 has been deformed by a corner portion 22A of a barrier 22 is illustrated by solid lines, while its shape in a state prior to a collision is illustrated by double-dotted intermittent lines.

The front side members 14 and the bumper reinforcement 18 described above configure respective framework members of a vehicle body. Crash boxes that are compressed along the vehicle front-rear direction so as to undergo plastic deformation and absorb collision energy when input with collision load of a specific value or greater through the bumper reinforcement 18, may also be installed to the front end portions 14A of the front side members 14.

Configuration of Relevant Portions

Extension Portion 30

As illustrated in FIG. 1, a plate shaped extension portion 30 is attached to a rear face 20A3 of each vehicle width direction outer side end portion 20A of the bumper reinforcement 18 described above. As illustrated in FIG. 4 to FIG. 7, the extension portion 30 is configured by a substantially rectangular, flat plate shaped plate body 30A, and a pair of short upper and lower flanges 30B bent toward the vehicle front side at an upper edge portion and a lower edge portion of the plate body 30A. The rigidity of the extension portion 30 is raised due to providing the pair of upper and lower flanges 30B.

As illustrated in FIG. 1, a vehicle width direction inside portion of the plate body 30A is fastened and fixed to the rear face 20A3 of the end portion 20A of the vehicle width direction outer side portion 20 of the bumper reinforcement 18, by a fixing method such as a fixing bolt 32 and a weld nut, not illustrated in the drawings. The extension portion 30 is thereby attached to the rear face 20A3 of the vehicle width direction outer side end portion 20A of the bumper reinforcement 18, and a vehicle width direction outer side portion of the plate body 30A extends further to the vehicle width direction outer side than an end face 20A1 of the vehicle width direction outer side end portion 20A of the bumper reinforcement 18. In other words, the plate shaped extension portions 30 are provided due to limitations in the vehicle to extending the vehicle width direction outer side end portions 20A of the bumper reinforcement 18 out a long way beyond the side faces 14B on the vehicle width direction outer sides of the front side members 14.

Projection Portion 34

As illustrated in FIG. 4 to FIG. 7, a block shaped projection portion 34 is installed at a front face 30A1 of a vehicle width direction outer side portion of the plate body 30A of the extension portion 30 described above. The projection portion 34 is configured by a main body 36 that has a hat profile in plan view, and plural reinforcement members 38 disposed inside the main body 36.

The main body 36 is configured by an inner wall 36A and an outer wall 36B, disposed facing each other along the vehicle width direction, and a front wall 36C connecting together a front end portion of the inner wall 36A and a front end portion of the outer wall 36B along the vehicle width direction. The inner wall 36A and the outer wall 36B extend substantially in the vehicle front-rear direction.

A rear end portion of the inner wall 36A is bent toward the vehicle width direction inside to configure an inside flange 36A1. The inside flange 36A1 is joined (fixed) to the front face 30A1 of the extension portion 30 by an arc weld 40 (see FIG. 7). A rear end portion of the outer wall 36B is bent toward the vehicle width direction outer side to configure an outside flange 36B1. The outside flange 36B1 is joined (fixed) to the front face 30A1 of the extension portion 30 by an arc weld 42 (see FIG. 7).

The inside flange 36A1 of the inner wall 36A corresponds to "one end portion of an inner wall" of the present invention, and a front end portion of the inner wall 36A (not allocated a reference numeral) corresponds to "another end portion of the inner wall" of the present invention. Similarly, the outside flange 36B1 of the outer wall 36B corresponds to "one end portion of an outer wall" of the present invention, and a front end portion of the outer wall 36B (not allocated a reference numeral) corresponds to "another end portion of the outer wall" of the present invention.

As illustrated in FIG. 1, the front wall 36C extends along the vehicle width direction and the vehicle up-down direction. A front face 36C1 of the front wall 36C is configured by a flat face.

Figure 4:
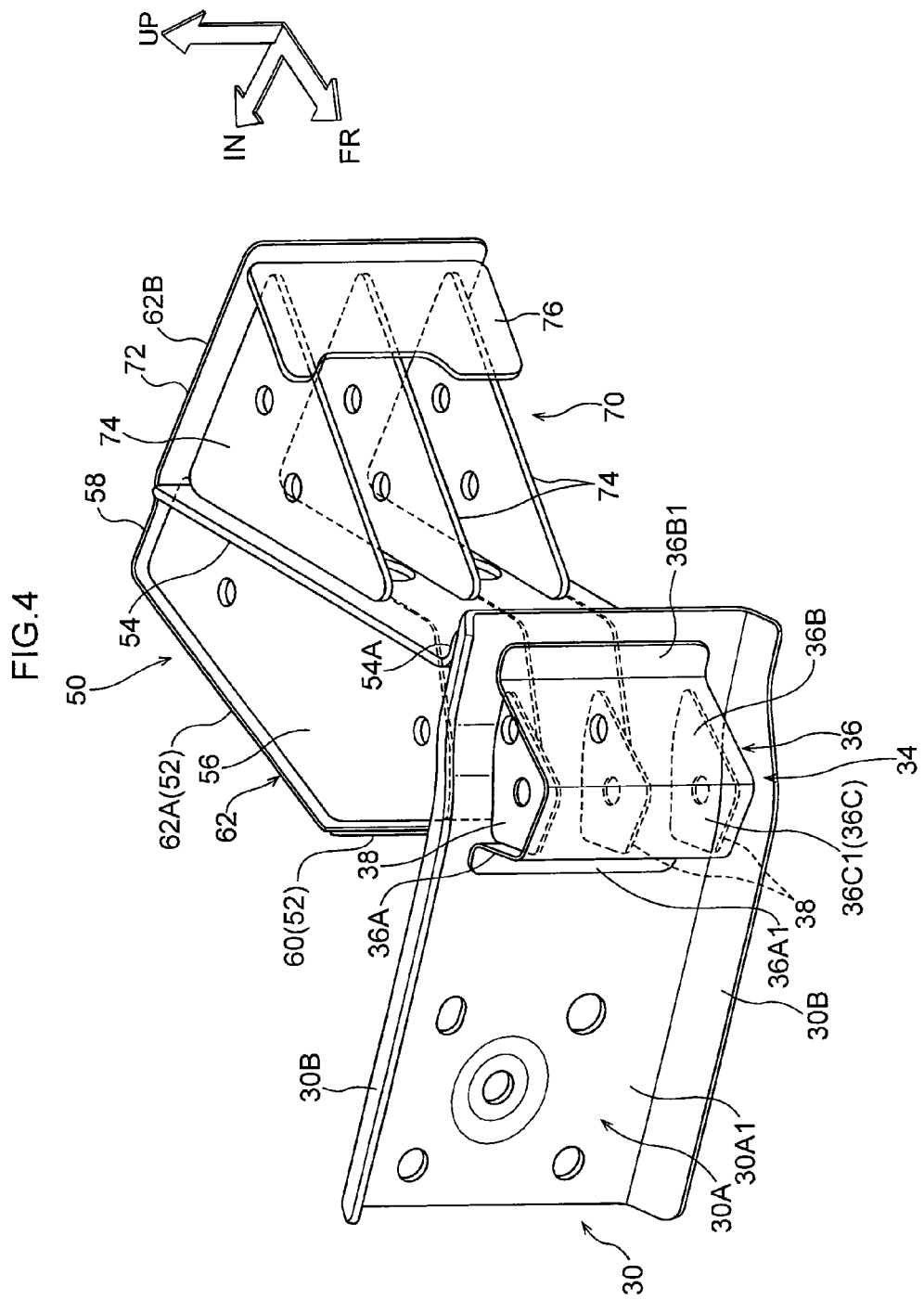
FIG. 4 is a perspective view illustrating relevant portions of a vehicle front section structure according to an exemplary embodiment of the present invention, as viewed diagonally from above and outside.
Figure 5:
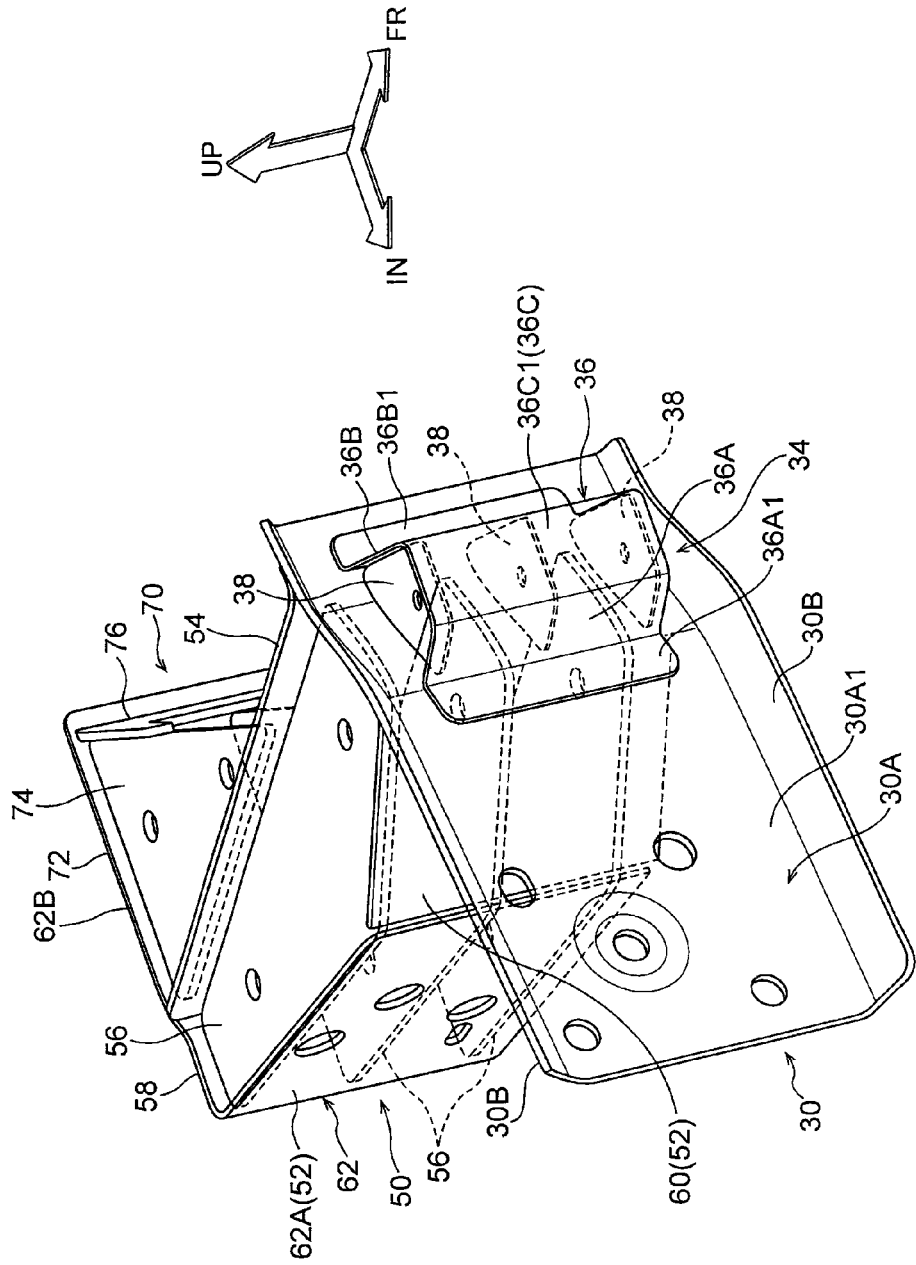
FIG. 5 is a perspective view illustrating relevant portions of a vehicle front section structure according to an exemplary embodiment of the present invention, as viewed diagonally from above and outside.
Figure 6:
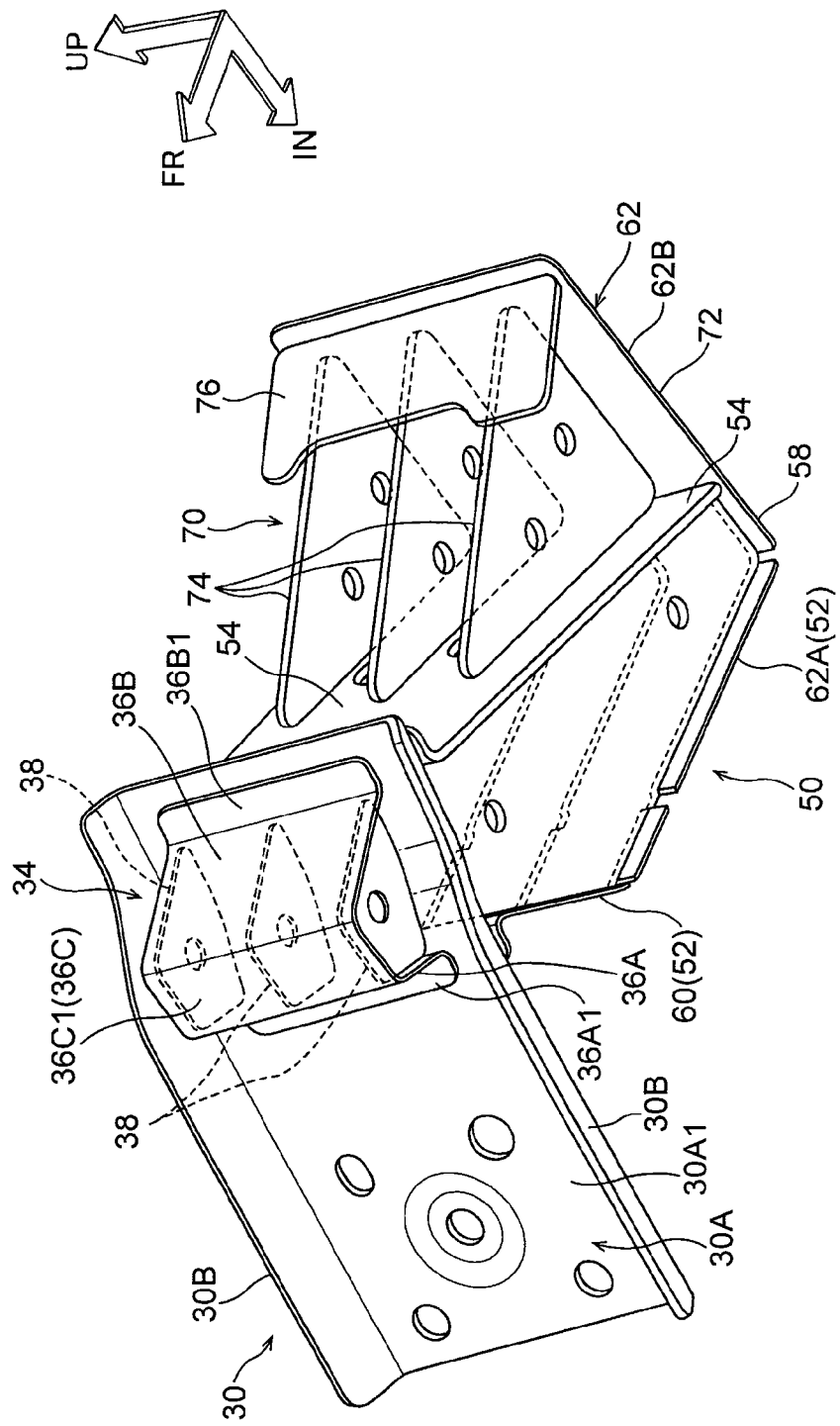
FIG. 6 is a perspective view illustrating relevant portions of a vehicle front section structure according to an exemplary embodiment of the present invention, as viewed diagonally from below and outside.

As illustrated in FIG. 4 to FIG. 6, the plural reinforcement members 38 are disposed inside the projection portion 34, at plural tiers in the vehicle up-down direction. Each reinforcement member 38 is configured from a plate member with a substantially trapezoidal shape in plan view, and outer peripheral portions thereof are respectively joined to inside faces of the inner wall 36A, the outer wall 36B, and the front wall 36C by arc welding or the like. The inner wall 36A, the outer wall 36B, and the front wall 36C are accordingly coupled together by the reinforcement members 38.

As illustrated in FIG. 1, a projection height a of the projection portion 34 mentioned above (the length from the front face 30A1 of the plate body 30A of the extension portion 30 to the front face 36C1 of the front wall 36C) is set with a specific height. Specifically, the projection height a is set at a height at which the front face 36C1 of the front wall 36C of the projection portion 34 contacts a main flat face portion 22B of the barrier 22 when the corner portion 22A of the barrier 22 has slightly deformed the front face 20A2 of the vehicle width direction outer side end portion 20A of the bumper reinforcement 18. Note that the projection height a does not necessarily have to match the contact height, and may be somewhat higher, or somewhat lower, than the contact height.

The projection portion 34 described above is disposed at a position even further to the vehicle width direction outer side than the vehicle width direction outer side end portion 20A of the bumper reinforcement 18, so as to be separated therefrom. A specific gap 44 is accordingly formed between the end face 20A1 of the vehicle width direction outer side end portion 20A of the bumper reinforcement 18 and the inner wall 36A of the projection portion 34.

Spacer 50

As illustrated in FIG. 1, and FIG. 4 to FIG. 6, an angular tube shaped spacer 50 couples together a vehicle width direction outer side portion of the plate body 30A of the extension portion 30 and a side wall 14C on the vehicle width direction outer side of the front side member 14, along the vehicle front-rear direction.

Structurally, the spacer 50 is configured from an inside wall 52 and an outside wall 54 disposed facing each other along the vehicle width direction, plural partitioning plates 56 coupling the inside wall 52 and the outside wall 54 together along the vehicle width direction, and a rear end wall 58 that is disposed at vehicle rear side end portions of the partitioning plates 56 and that couples together a rear end portion of the inside wall 52 and a rear end portion of the outside wall 54 along the vehicle width direction.

A front portion of the inside wall 52 is disposed at an angle toward the vehicle width direction outer side such that the front portion is positioned further to the vehicle width direction outer side than a rear portion of the inside wall 52 with respect to the side face 14B on the vehicle width direction outer side of the front side member 14. The outside wall 54 is disposed at the vehicle width direction outer side of the inside wall 52. The entire outside wall 54 is disposed at an angle toward the vehicle width direction outer side such that a front portion of the outside wall 54 is positioned further to the vehicle width direction outer side than a rear portion with respect to the side face 14B on the vehicle width direction outer side of the front side member 14.

More specifically, each of the partitioning plates 56 is formed with a long, thin five-sided profile extending substantially along the vehicle front-rear direction in plan view. The inside wall 52 is disposed so as to follow two sides on the vehicle width direction inside of each partitioning plate 56, and the outside wall 54 is disposed so as to follow an oblique side that faces these two sides along the vehicle width direction.

The inside wall 52 is configured by a first cover plate 60 disposed at a front portion side, and an upright wall 62A of a second cover plate 62 that is disposed at a rear portion side and has an angled shape in plan view. Namely, the inside wall 52 is split into a front end side and a rear end side. Note that the inside wall does not necessary have to be split, and may be configured by a single cover plate. The cover plates are split in order to reduce the vehicle weight, if only slightly, by eliminating a plate at a connection location (bent portion) between front portion and rear portion.

Figure 7:
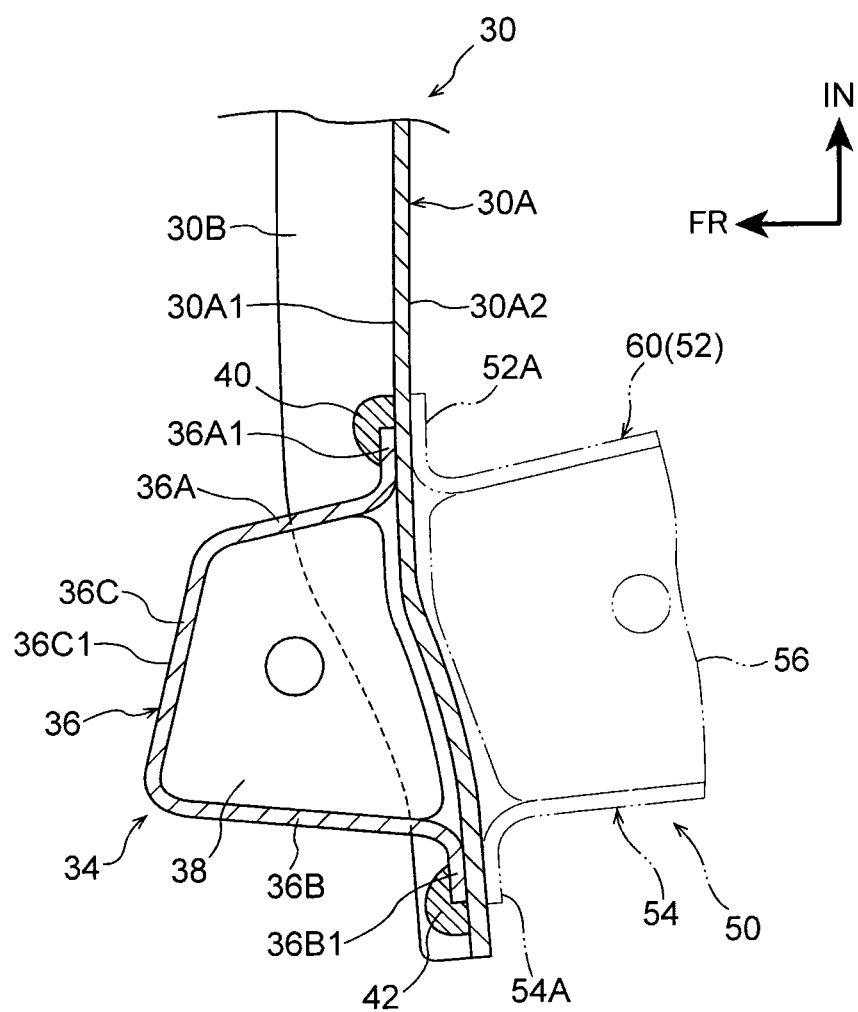
FIG. 7 is an enlarged plan view cross-section illustrating a fixing structure of a projection portion illustrated in FIG. 1.

As illustrated in FIG. 7, a front end portion of the first cover plate 60 is bent toward the vehicle width direction inside to configure an inside flange 52A (of the inside wall 52). The inside flange 52A is joined (fixed) to a rear face 30A2 of the plate body 30A of the extension portion 30 by arc welding. The first cover plate 60 is joined (fixed) to side faces at the inside of front portions of the plural partitioning plates 56 by arc welding.

As illustrated in FIG. 1, the upright wall 62A of the second cover plate 62 is overlaid with the side face 14B on the vehicle width direction outer side of the front side member 14, and fastened and fixed thereto by respective pairs of bolts 64 and weld nuts 66, at the front and rear in plan view. Note that the spacer 50 may be attached to the side wall 14C on the vehicle width direction outer side of the front side member 14 by welding instead of bolt fastening. Note that side faces at the inside of rear portions of the plural partitioning plates 56 are joined (fixed) to a vehicle width direction outer side face of the upright wall 62A of the second cover plate 62 by arc welding.

As illustrated in FIG. 7, a front end portion of the outside wall 54 is bent toward the vehicle width direction outer side to configure an outside flange 54A, and the outside flange 54A is joined (fixed) to the rear face 30A2 of the plate body 30A of the extension portion 30 by arc welding. The outside wall 54 is joined (fixed) to side faces on the vehicle width direction outer side of the plural partitioning plates 56 by arc welding.

As illustrated in FIG. 1, and FIG. 4 to FIG. 6, the rear end wall 58 is formed in an L-shape in plan view. The rear end wall 58 is configured by part of a lateral wall 62B of the second cover plate 62 mentioned above. A rear side portion of the inside wall 52 and the rear end wall 58 are accordingly configured by a single member.

In the present exemplary embodiment, the inside wall 52, the outside wall 54, and the partitioning plates 56 are all configured by separate components; however there is no limitation thereto, and the inside wall 52 and the outside wall 54 may be configured as a separate component to the partitioning plates 56. Namely, the inside wall 52, the rear end wall 58, and the outside wall 54 may be configured by a single component formed substantially in a U-shape open at a vehicle front side in plan view.

Next, explanation follows regarding a relationship between the walls configuring the projection portion 34 described above, and the walls configuring the spacer 50.

Figure 8:
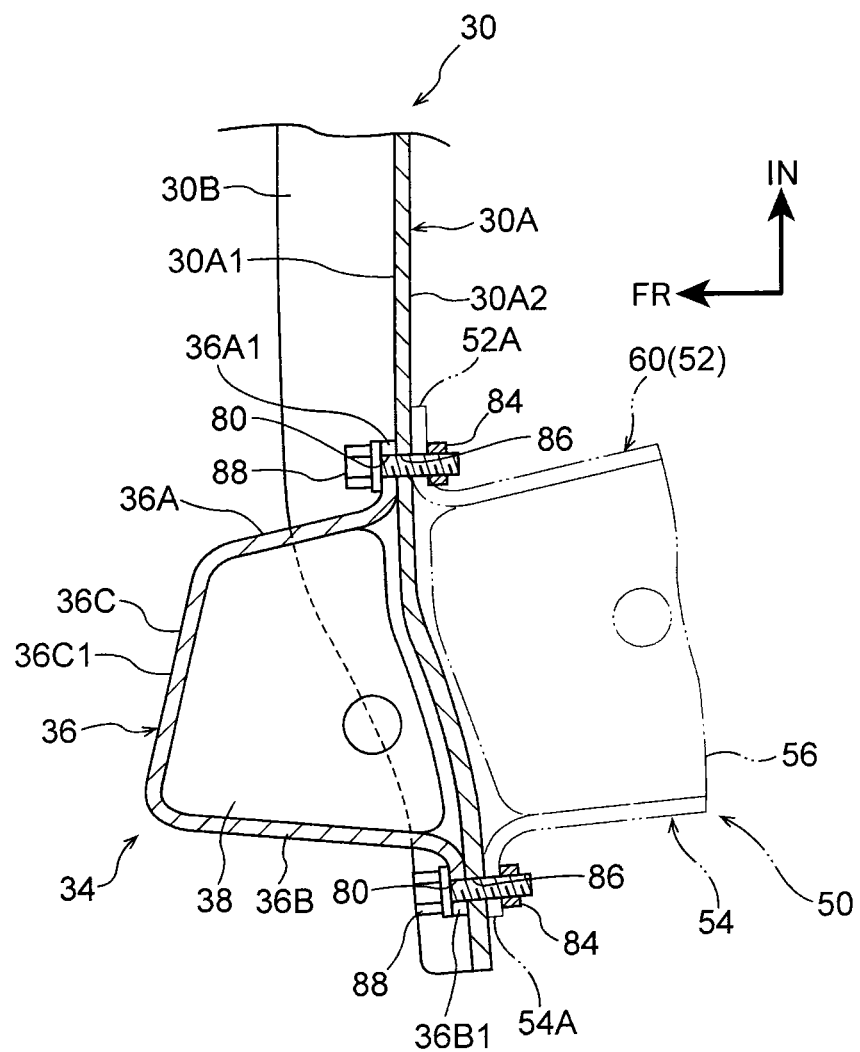
FIG. 8 is a plan view cross-section corresponding to FIG. 7, illustrating a modified example of a fixing structure of the projection portion illustrated in FIG. 7.

As illustrated in FIG. 8, the inside flange 36A1 (one end portion) of the inner wall 36A of the projection portion 34 is disposed at the vehicle front side of the inside wall 52 of the spacer 50, with the plate body 30A of the extension portion 30 interposed between them. The outside flange 36B1 (one end portion) of the outer wall 36B of the projection portion 34 is disposed at the vehicle front side of the outside wall 54, with the plate body 30A of the extension portion 30 disposed between them. Namely, the inner wall 36A of the projection portion 34 is disposed substantially along the extension direction of the inside wall 52 of the spacer 50. Similarly, the outer wall 36B of the projection portion 34 is disposed substantially along the extension direction of the outside wall 54 of the spacer 50.

The reinforcement members 38 inside the projection portion 34 and the partitioning plates 56 inside the spacer 50 are disposed at the same heights as each other in the vehicle up-down direction. Namely, the reinforcement members 38 and the partitioning plates 56 are disposed in the same respective planes as each other.

Spacer Extension Portion 70

As illustrated in FIG. 1, and in FIG. 4 to FIG. 6, a spacer extension portion 70 that has a substantially isosceles triangle shape in plan view is disposed on the vehicle width direction outer side of the spacer 50 described above. The spacer extension portion 70 is configured by an extension wall 72, plural support walls 74, and a reinforcement wall 76.

More specifically, the lateral wall 62B of the second cover plate 62 mentioned above is disposed orthogonally to the side face 14B on the vehicle width direction outer side of the front side member 14. A portion of the lateral wall 62B is disposed along rear edges of the partitioning plates 56 of the spacer 50, and configures the rear end wall 58 of the spacer 50. The remainder of the lateral wall 62B of the second cover plate 62 configures the extension wall 72 of the spacer extension portion 70, and extends the rear end wall 58 of the spacer 50 toward the vehicle width direction outer side. In the present exemplary embodiment, the rear end wall 58 of the spacer 50 and the extension wall 72 of the spacer extension portion 70 are accordingly configured from the same member. The rear end wall 58 of the spacer 50 and the extension wall 72 of the spacer extension portion 70 may, however, be configured by separate components. A length C of the extension wall 72 along the vehicle width direction is set longer than a length B of the front side member 14 along the vehicle width direction.

The plural support walls 74 are disposed orthogonally to the outside wall 54 (angled wall) of the spacer 50, and at the vehicle width direction outer side thereof. The plural support walls 74 are disposed parallel to an upper face 14D of the front side member 14. An oblique edge on the vehicle width direction inside of each of the support walls 74 is arc welded to a side face on the vehicle width direction outer side of the outside wall 54 of the spacer 50. Base edges of the respective support walls 74 are welded to a face on the vehicle front side of the extension wall 72 of the lateral wall 62B of the second cover plate 62. The support walls 74 accordingly couple the extension wall 72 to the outside wall 54 of the spacer 50 in the vehicle front-rear direction. At the same time, the extension wall 72 is supported by the outside wall 54, the angled wall, through the support walls 74.

The present exemplary embodiment is set with the same number (three) of the reinforcement members 38 of the projection portion 34 described above as the number of the partitioning plates 56 of the spacer 50 and the number of the support walls 74 of the spacer extension portion 70. Moreover, the reinforcement members 38, the partitioning plates 56, and the support walls 74 are disposed at the same heights as each other in the vehicle up-down direction. Namely, the reinforcement members 38, the partitioning plates 56, and the support walls 74 are disposed in the same planes as each other. Note that the above is merely an example, and configuration may be made with a single support wall 74, or with two, or four or more, support walls 74.

In the present exemplary embodiment, the support walls 74 are formed in isosceles triangle shapes in plan view, such that the length of the support walls 74 along the vehicle width direction decreases on progression toward the vehicle front side. However, there is no limitation thereto, and the support walls 74 may be formed in right-angled triangle shapes, or may be formed in other shapes.

A vehicle rear side face of the lateral wall 62B of the second cover plate 62 is configured by a flat face. Namely, the lateral wall 62B is not formed with height differences or undulations in the vehicle front-rear direction, and the vehicle rear side face of the lateral wall 62B is configured as a continuous flat face along the vehicle width direction and the vehicle up-down direction.

The reinforcement wall 76 disposed at the oblique edges on the vehicle width direction outer side of the plural support walls 74, at the extension wall 72 side. The reinforcement wall 76 couples the plural support walls 74 together along the vehicle up-down direction by being arc welded to the vehicle width direction outer side oblique edges of the plural support walls 74.

Next, explanation follows regarding operation and advantageous effects of the present exemplary embodiment.

Overall Operation and Advantageous Effects

Initial Period in Small Overlap Collision

In the vehicle front section structure according to the present exemplary embodiment, each vehicle width direction outer side end portion 20A of the bumper reinforcement 18 is provided with the extension portion 30 extending further to the vehicle width direction outer side than the rear face 20A3 of the end portion 20A. At the front face of the extension portion 30, the projection portion 34 is disposed projecting out toward the vehicle front side at a position separated from the vehicle width direction outer side end portion 20A of the bumper reinforcement 18 at the vehicle width direction outer side. The front end portion of the spacer 50 is joined to the rear face 30A2 of the plate body 30A of the extension portion 30, the rear end portion of the spacer 50 being joined to the side face 14B on the vehicle width direction outer side of the front side member 14 and the spacer 50 extending to the vehicle width direction outer side of the front side member 14. Accordingly, as illustrated in FIG. 1, in the event of a small overlap collision, the barrier 22 quickly contacts the front wall 36C of the projection portion 34 in an initial period of a small overlap collision. A collision load F is thus input to the projection portion 34 from the point in time of the initial period of the small overlap collision.

Initial Period Onward in Small Overlap Collision

Figure 2:
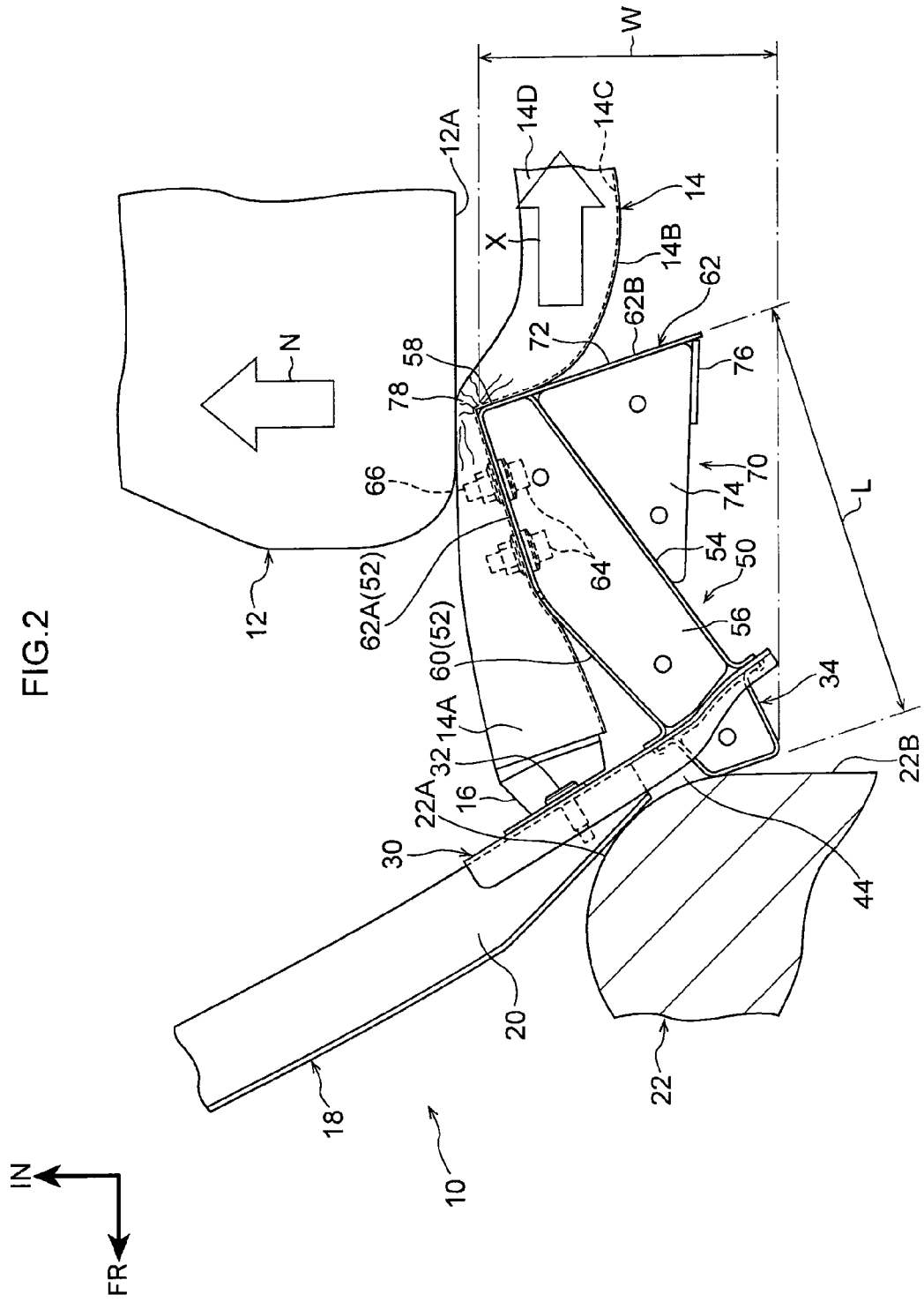
FIG. 2 is a plan view illustrating a state in which a front side member has folded inward from the state illustrated in FIG. 1.

As illustrated in FIGS. 1 and 2, when the collision load F is input to the projection portion 34, in a case in which d is the distance from a center line P passing through the centroid of the front side member 14 in plan view, to a vehicle front-rear direction line Q passing through the input position of the collision load F, then a bending moment M (F×d) acts on the side face 14B on the vehicle width direction outer side of the front side member 14, through the projection portion 34 and the spacer 50. As a result, the front side member 14 undergoes bending deformation toward the vehicle width direction inside (for convenience referred to as "inward folding" below). A location 78 that has undergone bending deformation contacts a side face 12A of the power unit 12, pushing the power unit 12 toward the opposite side to the collision side. Namely, lateral force (force due to inertia) N acts on the power unit 12 toward the opposite side to the collision side, and the lateral force N moves the vehicle away from the barrier 22.

Advantageous Effects Obtained from Individual Configuration Elements Operation and Advantageous Effects Due to Projection Portion 34 and Spacer 50

In the vehicle front section structure according to the present exemplary embodiment, the projection portion 34 includes the inner wall 36A that has one end portion (the inside flange 36A1) fixed to the front face 30A1 of the extension portion 30 and extends out to the vehicle front side, the outer wall 36B that is disposed at the vehicle width direction outer side of the inner wall 36A with one end portion (the outside flange 36B1) fixed to the front face 30A1 of the extension portion 30 and extending out toward the vehicle front side, and the front wall 36C that connects another end portion of the inner wall 36A to another end portion of the outer wall 36B. The spacer 50 includes the inside wall 52 disposed at an angle toward the vehicle width direction outer side, such that a front portion (the first cover plate 60) is positioned further to the vehicle width direction outer side than a rear portion (the upright wall 62A of the second cover plate 62) with respect to the side face 14B on the vehicle width direction outer side of the front side member 14, and the outside wall 54 that is disposed at the vehicle width direction outer side of the inside wall 52 and entirely at an angle toward the vehicle width direction outer side, such that the front portion is positioned further to the vehicle width direction outer side than the a portion with respect to the side face 14B on the vehicle width direction outer side of the front side member 14. The one end portion (the inside flange 36A1) of the inner wall 36A is disposed at the vehicle front side of the inside wall 52 with the extension portion 30 interposed therebetween, and the one end portion (the outside flange 36B1) of the outer wall 36B is disposed at the vehicle front side of the outside wall 54, with the extension portion 30 interposed therebetween.

The collision load F input to the inner wall 36A of the projection portion 34 is accordingly efficiently transmitted through the extension portion 30 to the inside wall 52 of the spacer 50. Similarly, the collision load F input to the outer wall 36B of the projection portion 34 is efficiently transmitted through the extension portion 30 to the outside wall 54 of the spacer 50. Moreover, adjusting the projection amount a of the projection portion 34 enables the timing at which the front side member 14 undergoes bending deformation to be controlled. In addition, the projection portion 34 is disposed at a position separated from and to the vehicle width direction outer side of the vehicle width direction outer side end portion 20A of the bumper reinforcement 18, thereby enabling the bending moment M input to the front side member 14 from the spacer 50 to be increased, and thus enabling stable inward folding of the front side member 14.

As illustrated in FIG. 2, since the projection portion 34 is present at the vehicle front side of the spacer 50, with the extension portion 30 interposed therebetween, when the spacer 50 is squeezed between the barrier 22 and the power unit 12 and generates load, a length L from another end portion of the projection portion 34 (the front end portion of the outer wall 36B in the present exemplary embodiment) to a rear end portion (rear end wall 58) of the spacer 50 (a vehicle width direction inside end portion of the rear end wall 58), and a length (overlap amount) W along the vehicle width direction from the other end portion of the projection portion 34 to the rear end portion of the spacer 50 (the vehicle width direction inside end portion of the rear end wall 58), are increased by an amount corresponding to the projection amount a of the projection portion 34 at the point in time when the front side member 14 that has undergone bending deformation contacts the power unit 12. Controlling the movement trajectory of the spacer 50 in this manner enables the duration for which lateral force N is generated on the power unit 12 to be sustained for longer, thereby enabling a commensurate increase in the lateral force N.

The vehicle front section structure according to the present exemplary embodiment accordingly enables collision load F to be swiftly and effectively transmitted to the front side member 14 during a small overlap collision, and moreover enables lateral force N generated on the power unit 12 to be increased.

As illustrated in FIG. 1, the front wall 36C of the projection portion 34 extends along the vehicle width direction and the vehicle up-down direction, and therefore makes contact at a right angle with the main flat face portion 22B of the barrier 22. The collision load F accordingly acts in a direction straight toward the rear of the projection portion 34, enabling the bending moment M input to the side face 14B on the vehicle width direction outer side of the front side member 14 to be caused to act efficiently.

The inner wall 36A, the outer wall 36B, and the front wall 36C of the projection portion 34 are coupled together by the reinforcement members 38 extending in the vehicle front-rear direction and the vehicle width direction. This thereby enables the strength and rigidity of the projection portion 34 to be raised, while suppressing an increase in weight.

The reinforcement members 38 provided inside the projection portion 34, and the partitioning plates 56 provided inside the spacer 50, are disposed at the same respective heights as each other in the vehicle up-down direction, such that the reinforcement members 38 and the partitioning plates 56 are present in the same respective planes as each other. Continuous strength and rigidity can accordingly be created across the range in which the projection portion 34 and the spacer 50 are disposed. The collision load F input to the projection portion 34 in the initial period of a small overlap collision can accordingly be effectively utilized for folding the front side member 14 inward.

The inside wall 52, the outside wall 54, and the partitioning plates 56 of the spacer 50 are configured by separate components, thereby enabling the performance demanded of the inside wall 52 and the outside wall 54 (disposed substantially along the respective extension directions of the inner wall 36A and the outer wall 36B of the projection portion 34 and having the role of forming a load transmission line from the front wall 36C of the projection portion 34 to the side face 14B on the vehicle width direction outer side of the front side member 14), and the performance demanded of the partitioning plates 56 (having the role of supporting the inside wall 52 and the outside wall 54 of the spacer 50 in a direction orthogonal to their respective faces, preventing lateral collapse of the inside wall 52 and the outside wall 54, and of efficiently transmitting collision load transmitted from the reinforcement members 38 of the projection portion 34 to the side face 14B on the vehicle width direction outer side of the front side member 14) to be set using separate members.

Operation and Advantageous Effects Due to Spacer Extension Portion 70

In the event of a small overlap collision, collision load is input from the barrier 22 to the spacer 50 provided at the side face 14B on the vehicle width direction outer side of the front side member 14. The collision load F input to the spacer 50 is transmitted to the side face 14B on the vehicle width direction outer side of the front side member 14 via the outside wall 54 and the rear end wall 58 of the spacer 50. The front side member 14 accordingly undergoes bending deformation toward the vehicle width direction inside, and the location 78 that has undergone bending deformation contacts the power unit 12, generating lateral force (force due to inertia) on the power unit 12 toward the opposite side to the collision side.

Note that it is conceivable that variations in vehicle structures, test conditions, or the like could cause change in the way the spacer 50 strikes the power unit 12 across the front side member 14, so that a target load is not obtainable stably.

Figure 3:
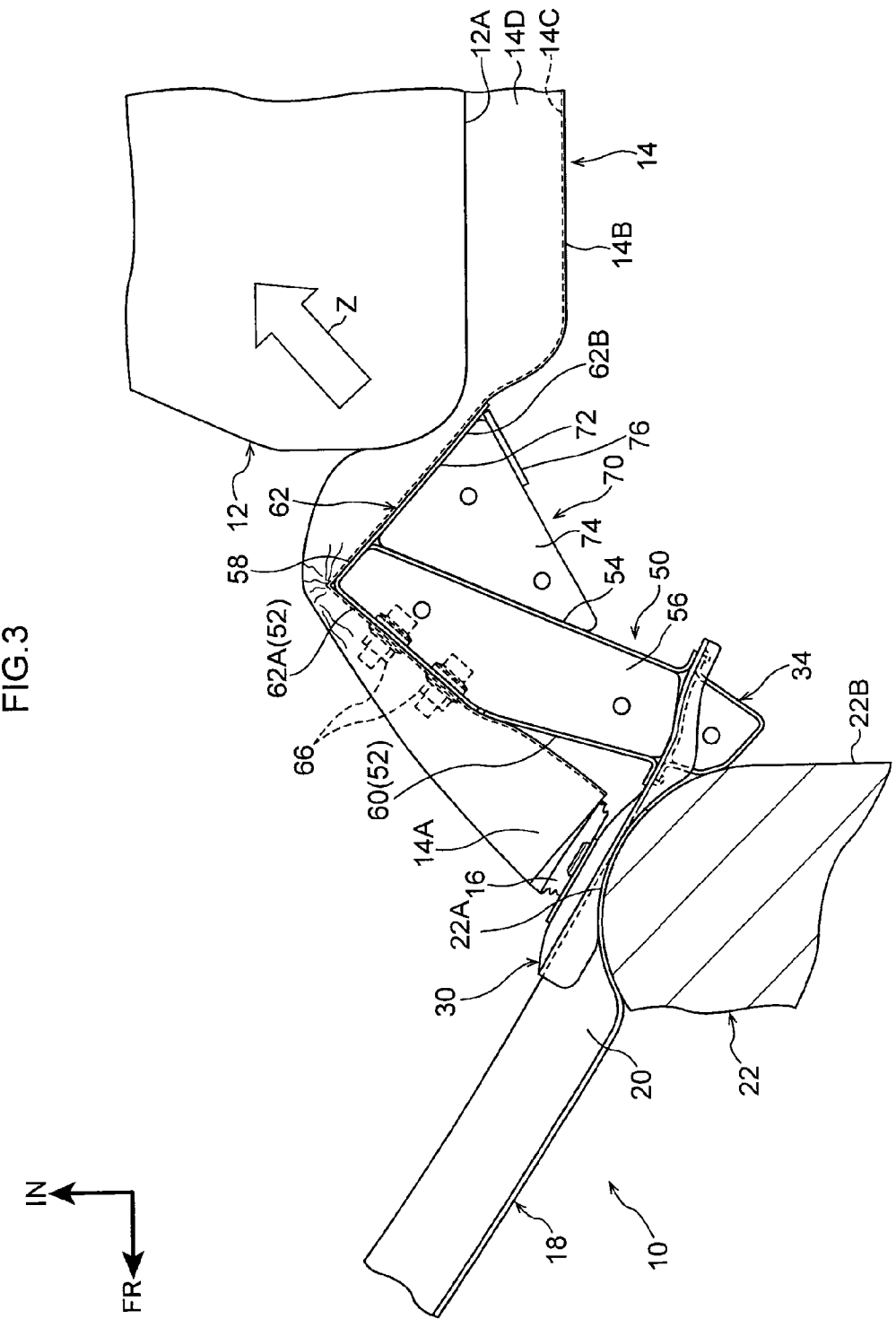
FIG. 3 is a plan view to explain an advantageous effect due to providing a spacer extension portion.

However, in the present exemplary embodiment, the spacer extension portion 70 is provided at the vehicle width direction outer side of the outside wall 54 of the spacer 50, and the rear end wall 58 of the spacer 50 is extended toward the vehicle width direction outer side by the extension wall 72. Accordingly, as illustrated in FIG. 2, even supposing there was a reduction in the load with which the spacer 50 causes the front side member 14 to undergo axial compression deformation in the vehicle front-rear direction due to variation in vehicle structures, test conditions, or the like, the extension wall 72 of the spacer extension portion 70 would, in place of the rear end wall 58 of the spacer 50, continue to cause axial compression load (illustrated by the arrow X) to act on the front side member 14 toward the vehicle rear side, causing the front side member 14 to undergo axial compression plastic deformation. Moreover, as illustrated in FIG. 3, even supposing the load with which the spacer 50 presses the power unit 12 toward the opposite side to the collision side was to be reduced due to variation in vehicle structures, test conditions, or the like, the extension wall 72 of the spacer extension portion 70 would still, in place of the rear end wall 58 of the spacer 50, continue to press the power unit 12 toward the opposite side to the collision side to cause lateral force (illustrated by the arrow Z) to act on the power unit 12.

Accordingly, the vehicle front section structure according to the present exemplary embodiment enables the front side member 14 to be made to undergo stable axial compression deformation in the vehicle front-rear direction, and enables lateral force to be made to act on the power unit 12 stably, in a small overlap collision, even when there are variations in vehicle structures, test conditions, or the like.

Other Exemplary Embodiments

Regarding the Projection Portion Fixing Structure

As illustrated in FIG. 7, in the present exemplary embodiment, the inside flange 36A1 and the outside flange 36B1 of the projection portion 34 are joined to the front face 30A1 of the plate body 30A of the extension portion 30 by arc welding. However, there is no limitation thereto, and a welding technique such as spot welding or laser welding may be employed.

As illustrated in FIG. 8, instead of welding, a mechanical fixing technique may be employed to fix a projection portion to an extension portion. In this example, bolt insertion holes 80 are respectively formed to the inside flange 36A1 of the inner wall 36A and the outside flange 36B1 of the outer wall 36B of the projection portion 34. Similarly, bolt insertion holes 82 are also formed to the inside flange 52A of the inside wall 52 and the outside flange 54A of the outside wall 54 of the spacer 50, coaxially to the bolt insertion holes 80. Weld nuts 84 are welded to the inside flange 52A and the outside flange 54A respectively. The plate body 30A of the extension portion 30 is also formed with bolt insertion holes 86, coaxially to the bolt insertion holes 80, 82. Bolts 88 are screwed onto the weld nuts 84, thereby fastening the projection portion 34 to the front face 30A1 of the plate body 30A of the extension portion 30, together with the spacer 50. Rivets or the like may also be employed in addition to the bolts 88 and the weld nuts 84.

According to the above configuration, due to fixing the projection portion 34 to the extension portion 30 using the bolts 88 and the weld nuts 84 or the like, the projection portion 34 can be removed from the extension portion 30 as required. Considering that even in small overlap collisions, in a minor collision, the projection portion 34 undergoes plastic deformation (is crushed) in the vehicle front-rear direction and absorbs energy, adopting this configuration accordingly enables the projection portion 34 alone to be replaced in repair work following a minor collision. This thereby enables a reduction in repair costs.

Regarding Crushability of the Projection Portion

In the present exemplary embodiment, the plural reinforcement members 38 are disposed inside the main body 36 of the projection portion 34 that has a hat profile in plan view, and the projection portion 34 is configured so as not to buckle in the vehicle front-rear direction in a small overlap collision. Taking this line of thinking further, the projection portion 34 illustrated in FIG. 1 and FIG. 4 may be provided with extra reinforcement.

Figure 9:
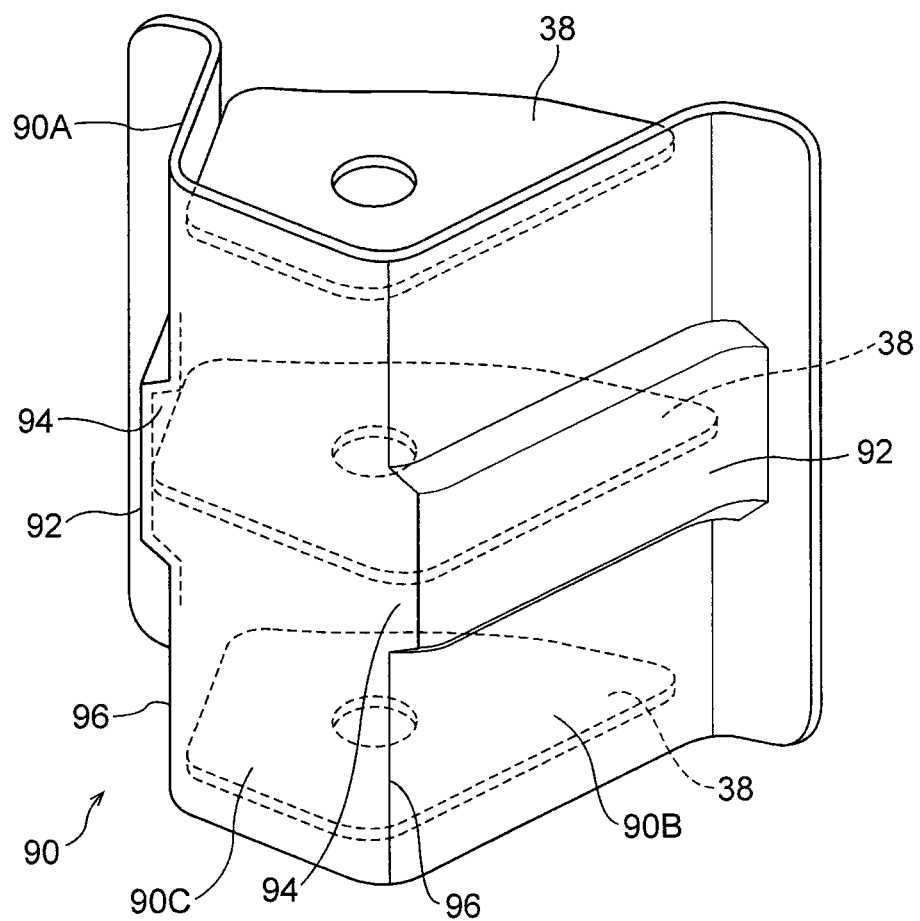
FIG. 9 is an enlarged perspective view illustrating a first modified example of the shape and structure of the projection portion illustrated in FIG. 4.

For example, a projection portion 90 illustrated in FIG. 9 is configured by the elements of an inner wall 90A, an outer wall 90B, and a front wall 90C, similarly to the projection portion 34. However, the inner wall 90A and the outer wall 90B are each formed with a raised bead 92, serving as a reinforcement portion and extending substantially in the vehicle front-rear direction. The raised beads 92 are disposed at vehicle up-down direction intermediate portions of the inner wall 90A and the outer wall 90B respectively. Protruding faces 94 are formed projecting out along the vehicle width direction at a height direction intermediate portion of the front wall 90C accompanying formation of the raised beads 92. In other words, the raised beads 92 are connected to ridge lines 96 on both vehicle width direction sides of the front wall 90C, and increase the length of the respective ridge lines 96. Plural reinforcement members 38 are disposed inside the projection portion 90 and couple together the inner wall 90A, the outer wall 90B, and the front wall 90C. The reinforcement member 38 disposed at the middle tier has a greater vehicle width direction width than the upper tier and lower tier reinforcement members 38, in order to couple together the left and right raised beads 92 in the vehicle width direction.

In the projection portion 90, the respective raised beads 92 are formed to the inner wall 90A and the outer wall 90B, and so the rigidity of the projection portion 90 with respect to collision load input from the vehicle front side is greater than that of the projection portion 34 illustrated in FIG. 1 and FIG. 4. This thereby enables faster transmission of collision load to the front side member 14 through the spacer 50 in the event of a small overlap collision. The front side member 14 can accordingly be folded inward more promptly, enabling earlier generation of lateral force on the power unit 12.

Note that there is no limitation to forming a single raised bead 92 on each wall face mentioned above, and plural raised beads 92 may be formed.

Figure 10:
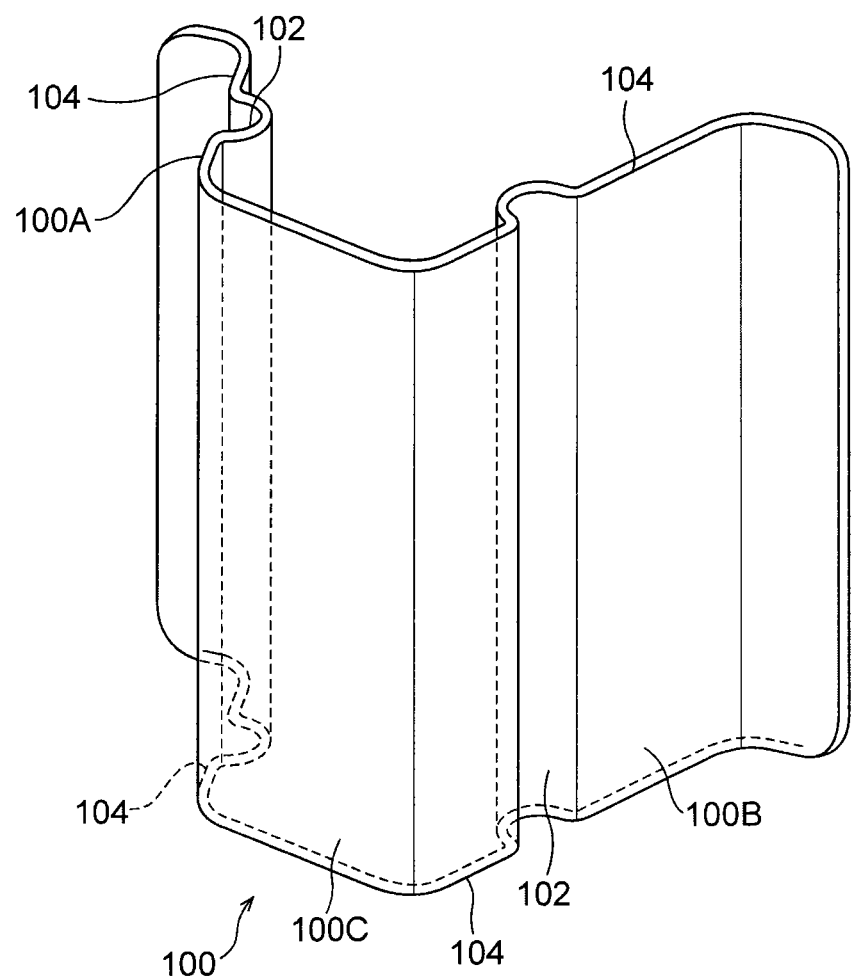
FIG. 10 is an enlarged perspective view illustrating a second modified example of the shape and structure of the projection portion illustrated in FIG. 4.

The projection portion 34 illustrated in FIG. 1 and FIG. 4, and the projection portion 90 illustrated in FIG. 9, are of a type that gives precedence to load transmission performance over energy absorption performance. However, the projection portion 100 illustrated in FIG. 10 may be employed when higher energy absorption performance is desired.

Explained briefly, the projection portion 100 is configured from the elements of an inner wall 100A, an outer wall 100B, and a front wall 100C, similarly to the projection portion 34. However, the inner wall 100A and the outer wall 100B are each formed with an indented bead 102, serving as a weakened portion and extending substantially in the vehicle up-down direction. The indented beads 102 are disposed at vehicle front-rear direction intermediate portions of the inner wall 100A and the outer wall 100B. Moreover, the indented beads 102 divide respective upper and lower ridge lines 104 of the inner wall 100A and the outer wall 100B. Note that reinforcement members 38 are not provided inside the projection portion 100.

In the projection portion 100, the inner wall 100A and the outer wall 100B are respectively formed with the indented beads 102, these being weakened portions.

Accordingly, when collision load is input from the vehicle front side, stress is concentrated on the indented beads 102. The inner wall 100A and the outer wall 100B accordingly buckle at the positions formed with the indented beads 102, and the projection portion 100 undergoes plastic compression deformation in the vehicle front-rear direction. The projection portion 100 accordingly absorbs some of the energy during a collision.

Note that there is no limitation to forming a single indented bead 102 on each wall face, and plural indented beads 102 may be formed.

Other

The present exemplary embodiment is provided with the spacer extension portion 70; however there is no limitation thereto, and the spacer extension portion may be omitted.

In the present exemplary embodiment, due to the installation relationship to the attachment seat, only the front portion (the first cover plate 60) of the inside wall 52 of the spacer 50 is disposed at an angle toward the vehicle width direction outer side with respect to the side face 14B on the vehicle width direction outer side of the front side member 14; however there is no limitation thereto, and both the front portion and the rear portion may be configured disposed at an angle toward the vehicle width direction outer side with respect to the side face on the vehicle width direction outer side of the front side member. In such cases, the attachment seat of the spacer to the front side member may be set at the side of a rear end wall that is configured in, for example, an L-shape in plan view, or an upper wall and a lower wall provided to the spacer may be respectively coupled to an upper wall and a lower wall of the front side member with another member interposed between them.

In the present exemplary embodiment, configuration is made in which not only a front portion, but also a rear portion, of the outside wall 54 of the spacer 50 is disposed at an angle toward the vehicle width direction outer side with respect to the side face 14B on the vehicle width direction outer side of the front side member 14; however there is no limitation thereto, and configuration may be made in which only a front portion is disposed at an angle toward the vehicle width direction outer side with respect to a side face on the vehicle width direction outer side of the front side member. For example, a rear portion of an outside wall may be disposed running parallel to a vehicle width direction side face of the front side member.

Moreover, in the present exemplary embodiment, the inside wall 52, the outside wall 54, and the partitioning plates 56 are all configured as separate components; however there is no limitation thereto, and configuration may be made such that at least one out of an inside wall or an outside wall is configured as a separate component to a partitioning plate. For example, all three of an inside wall, a rear end wall, and an outside wall may be configured by a single member.

In the present exemplary embodiment, the front face 36C1 of the front wall 36C of the projection portion 34 extends along the vehicle width direction and the vehicle up-down direction; however there is no limitation thereto, and the front face may be somewhat angled to the vehicle width direction, or may be somewhat angled to the vehicle up-down direction.

What is claimed is:

1. A vehicle front section structure comprising:
   a pair of left and right front side members extending along a vehicle front-rear direction at both vehicle width direction sides of a power unit installed in a vehicle front section;
   a bumper reinforcement connecting together front end portions of the pair of left and right front side members in a vehicle width direction;
   an extension portion that extends further to a vehicle width direction outer side from a rear face of a vehicle width direction outer side end portion of the bumper reinforcement;
   a projection portion that is disposed at a front face of the extension portion, at a position separated to the vehicle width direction outer side of the vehicle width direction outer side end portion of the bumper reinforcement, and that projects out toward a vehicle front side; and
   a spacer that is joined at a rear end portion thereof, to a side face on the vehicle width direction outer side of at least one of the front side members, that extends out to the vehicle width direction outer side of at least one of the front side members, and that has a front end portion of the spacer joined to a rear face of the extension portion, wherein:
   the projection portion includes
      an inner wall that has one end portion fixed to a front face of the extension portion, and that extends out toward the vehicle front side,
      an outer wall that is disposed at the vehicle width direction outer side of the inner wall, that has one end portion fixed to the front face of the extension portion, and that extends out toward the vehicle front side, and
      a front wall that connects another end portion of the inner wall to another end portion of the outer wall,
   the spacer includes
      an inside wall having at least a front portion disposed at an angle toward the vehicle width direction outer side, such that the front portion is positioned further to the vehicle width direction outer side than a rear portion with respect to the side face on the vehicle width direction outer side of the front side member, and
      an outside wall that is disposed at the vehicle width direction outer side of the inside wall, with at least a front portion of the outside wall disposed at an angle toward the vehicle width direction outer side, such that the front portion is positioned further to the vehicle width direction outer side than a rear portion with respect to the side face on the vehicle width direction outer side of the front side member, and
   the one end portion of the inner wall is disposed at the vehicle front side of the inside wall with the extension portion interposed therebetween, and the one end portion of the outer wall is disposed at the vehicle front side of the outside wall with the extension portion interposed therebetween.

2. The vehicle front section structure of claim 1, wherein the front wall extends along the vehicle width direction and a vehicle up-down direction.

3. The vehicle front section structure of claim 1, wherein the inner wall, the outer wall, and the front wall of the projection portion are coupled together by a reinforcement member extending in the vehicle front-rear direction and the vehicle width direction.

4. The vehicle front section structure of claim 1, wherein the inner wall and the outer wall of the projection portion are each provided with a reinforcement portion running in the vehicle front-rear direction.

5. The vehicle front section structure of claim 1, wherein the inner wall and the outer wall of the projection portion are each provided with a weakened portion running in a vehicle up-down direction.

6. The vehicle front section structure of claim 3, wherein:
   a plurality of the reinforcement members are disposed at intervals in a vehicle up-down direction;
   the spacer includes a plurality of partitioning plates that are disposed between the inside wall and the outside wall, that are joined to the inside wall and the outside wall, and that are disposed at intervals in the vehicle up-down direction; and
   the reinforcement members and the partitioning plates are disposed at same respective heights as each other in the vehicle up-down direction.

7. The vehicle front section structure of claim 6, wherein at least one of the inside wall or the outside wall of the spacer is configured as a separate component from the partitioning plates.

8. The vehicle front section structure of claim 2, wherein the inner wall, the outer wall, and the front wall of the projection portion are coupled together by a reinforcement member extending in the vehicle front-rear direction and the vehicle width direction.

9. The vehicle front section structure of claim 8, wherein:
   a plurality of the reinforcement members are disposed at intervals in the vehicle up-down direction;
   the spacer includes a plurality of partitioning plates that are disposed between the inside wall and the outside wall, that are joined to the inside wall and the outside wall, and that are disposed at intervals in the vehicle up-down direction; and
   the reinforcement members and the partitioning plates are disposed at same respective heights as each other in the vehicle up-down direction.

10. The vehicle front section structure of claim 9, wherein the inside wall, the outside wall, and the partitioning plates of the spacer are configured by separate components.

* * * * *